C. J. HAMILTON.
METHOD OF UNITING BARRELS OF AIR GUNS.
No. 11,247. Reissued June 21, 1892.
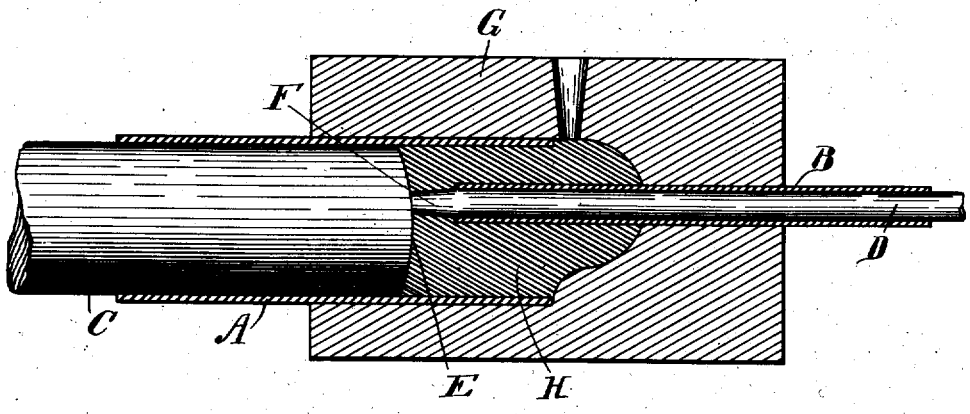
WITNESSES
B. F. Wheeler
O. B. Baenziger.
INVENTOR
Clarence J. Hamilton
By Edgar S. Wheeler
Attorney.

UNITED STATES PATENT OFFICE.

CLARENCE J. HAMILTON, OF PLYMOUTH, MICHIGAN.

METHOD OF UNITING BARRELS OF AIR-GUNS.

SPECIFICATION forming part of Reissued Letters Patent No. 11,247, dated June 21, 1892.

Original No. 427,313, dated May 6, 1890. Application for reissue filed March 28, 1892. Serial No. 426,851.

*To all whom it may concern:*

Be it known that I, CLARENCE J. HAMILTON, a citizen of the United States, residing at Plymouth, in the county of Wayne and State of Michigan, have invented certain new and useful Improvements in Barrels for Spring Air-Guns; and I do declare the following to be a full, clear, and exact description of the invention, such as will enable others skilled in the art to which it appertains to make and use the same, reference being had to the accompanying drawing, and to the letters of reference marked thereon, which form a part of this specification.

This invention relates to new and useful improvements in the manufacture of barrels for spring air-guns; and it consists in the peculiar method employed for uniting the false barrel, in which the spring air-gun mechanism is secured to the true barrel from which the bullet or dart is propelled, all as more fully hereinafter described and shown in the accompanying drawing, which represents a section through the false and true barrels as united in accordance with my invention, and in which—

A is the so-called "false barrel," which is of large diameter to form an air-chamber and to contain the spring-actuated piston for compressing the air therein, the true barrel B being of small diameter and united thereto in the following manner: If the two barrels are made of brass, then the two ends which are to be united are first coated with tin by dipping or otherwise, the false barrel on the inside and the true barrel on the outside. Then suitable mandrels C and D are placed into the barrels and the two barrels adjusted in relation to each other, as shown in the drawing, which is to be the relation in which the two barrels are finally secured to each other. The mandrel C in the false barrel has preferably the convex end E and the small mandrel in the true barrel the conical end F. Then a suitable mold G is placed at the junction of the two barrels. Type-metal or other suitable fusible metal is poured into the mold to form the breech-block H, which, as will be seen, will firmly unite the two barrels and hold them in proper relation to each other, while at the same time the conical seat F for the bullet is formed.

In making this class of goods heretofore the more expensive method of constructing the breech-block in a separate piece and then fitting the parts together has been employed, and the conical seat was generally formed by contracting the rear end of the true barrel. This was not only an expensive method, but it did not result in as substantial work as obtained by my present method, which is simple and inexpensive, furnishes a perfect air-tight joint, which will withstand the force of the spring air-gun without becoming detached, and which firmly holds the two barrels in their proper relation and forms at the same time the seat for the bullet without requiring the previous contraction of the rear end of the true barrel.

It is obvious that the tinning is omitted if metals are used which unite without it.

What I claim as my invention is—

1. The herein-described method of uniting the barrels of air-guns, which consists in first arranging the ends of two barrels of different diameters adjacent to but separated from each other, placing suitable mandrels of different diameters in the barrels, extending the end of one of said mandrels beyond its barrel and into contact with the end of the other mandrel, uniting the ends of said barrels by suitable molded metal, and finally removing the mandrels, substantially as specified.

2. The method of uniting the barrels of air-guns, which consists in arranging the ends of two barrels of different diameters so that one barrel extends into the other, but is separated therefrom, placing suitable mandrels in said barrels so that their inner ends are brought into contact, uniting the ends of said barrels by suitable molded metal which incases the smaller barrel and fills the adjacent end of the larger barrel, and finally removing the mandrels, substantially as set forth.

In testimony whereof I affix my signature in presence of two witnesses.

CLARENCE J. HAMILTON.

Witnesses:

H. R. WHEELER,

B. F. WHEELER.